Figure 1:
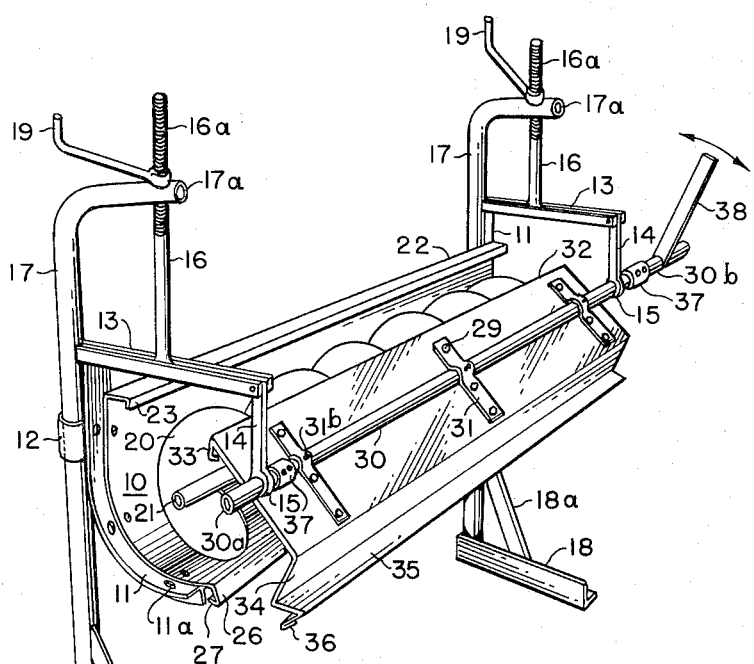

Oct. 5, 1965   J. R. BEEBE ETAL   3,209,898

SELF SEALING GATE AND TROUGH CONSTRUCTION

Filed July 27, 1964

INVENTORS,
JAMES R. BEEBE
BY EIVIND M. RAMBO

ATTORNEYS.

United States Patent Office 3,209,898
Patented Oct. 5, 1965

3,209,898
SELF SEALING GATE AND TROUGH CONSTRUCTION
James R. Beebe, New London, and Eivind M. Rambo, Ogdensburg, Wis., assignors to Avco Corporation, New London, Wis., a corporation of Delaware
Filed July 27, 1964, Ser. No. 385,370
2 Claims. (Cl. 198—205)

This invention relates to material handling and is concerned particularly with the transfer of feed and the like from a bin to a longitudinally extended bunk which is accessible to cattle from one or more sides for the purpose of feeding.

Equipment designed to accomplish this purpose is commonly referred to as bunk feeding equipment. It comprises an appropriately mounted trough extending parallel to and usually over the bunk from which the cattle are fed, within which trough is extended an auger which, upon rotation, carries the feed from one end of the trough to the other.

One type of this equipment comprises a trough which is J-shaped in cross-section and has an open side against which is mounted one or more gates which can be operated at appropriate intervals to permit feed carried through the trough by the auger to spill out into individual bunks located respectively below each gate.

Such gates are conveniently mounted on a horizontal shaft, the axis of which extends parallel to the trough and is located on one side thereof, such shaft also serving to actuate such gates when the shaft is turned.

In such constructions it is important that the gates be designed to fulfill certain special requirements. They must be sufficiently strong and rigid so that they will have minimum deflection, can be maintained in alignment, and will pivot easily about their axis of rotation so that they may be opened and closed with facility. It is also desirable that they be substantially balanced about their axis of rotation in order to minimize the power requirements for opening and closing them and to permit quick closing when the shaft is rotated, usually by an automatically timed mechanism. In addition, it is extremely desirable that the aperture through which the feed spills into the bunk is sealed tightly when the gates are closed so that dry feed does not continue to spill into the respective bunks.

In accordance with the present invention we have devised a material handling trough of the type described having gates which are sufficiently strong and rigid to enable a series of gates to be mounted along the side of the trough so that they can be operated easily by the rotation of a single shaft without undue deflection from the pressure of feed within the trough or "wrap up," i.e. excessive torsion of the operating shaft. Gates constructed and mounted according to the present invention have a minimum resistance to opening and may be opened quickly upon operation of the actuating shaft. In addition, the aperture through which the feed spills when the gates are opened seals itself when they are closed in order to prevent leakage of feed.

Figure 2:
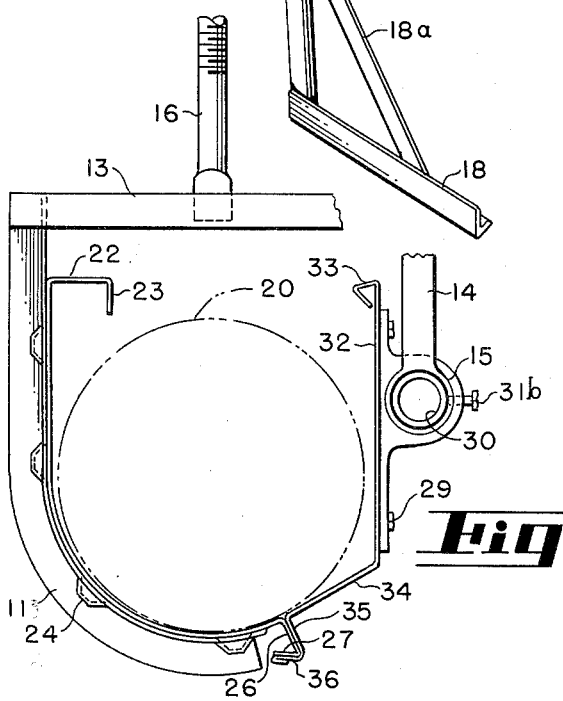

Other objects and advantages of the invention will more clearly appear when reference is had to the following specification and claims when read in the light of the accompanying drawings, in which:

FIG. 1 is a perspective view of an illustrative section of a bunk feeder with a gate constructed in accordance with the invention mounted along one side thereof; and FIG. 2 is a fragmentary end view of such apparatus, said view taken transversely to the longitudinal center line of the trough.

The trough 10 is preferably constructed of sheet metal and is mounted on supports 11 provided at intervals along the length of the trough. Trough 10 is generally of J configuration and supports 11 conform to its external periphery. Supports 11 are secured to sleeves 12, which slide vertically on supports 17, depending on the adjustment of the additional supporting structure which will now be described.

Secured to the top of supports 11 and extending transversely of the trough are supporting bars 13, the distal ends of which are secured to hangers 14 which extend downwardly and terminate in bearings 15 designed to accommodate the gate opening shafts 30 and 30a, the operation of which will hereinafter be explained.

Midway of transverse supporting bars 13 are secured upright hangers 16 which extend upwardly through openings in the inturned ends 17a of supports 17. The upper ends of hangers 16 are threaded and complementary threaded cranks 19 are provided.

With the structure described above it will be seen that the cranks 19 may be turned to move the transverse supporting bars 13 upwardly or downwardly to adjust the height of the trough so that auger 20 and trough 10 can be put in appropriate alignment. Sleeves 12 slip up and down on uprights 17 to accommodate whatever positions the trough takes as a result of the adjustments effected by cranks 19. Uprights 17 are suitably supported by base members 18 and braces 18a.

The auger 20 is supported on shaft 21 which is driven independently by a conventional mechanism (not shown) disposed at the end thereof.

The top of trough 10 is inturned at 22 and downturned at 23 to form a channel to provide longitudinal rigidity therefor. Intermediate of the trough at spaced intervals are provided struck up portions 24, within which are suitable apertures to permit screws to be inserted to secure the trough in appropriate openings 11a in the supports 11. The lower end of the trough, namely, the bottom of the J, is turned down at 26 at an angle short of the perpendicular and then turned back at 27 at an angle slightly greater than the horizontal, as shown in FIG. 2. In addition to the function hereinafter to be described, this construction provides a channel at the lower end of the J and along the side of the trough opposite the channel 22, 23 for enhancing the rigidity of the trough. The trough can be made of relatively light metal and maintained rigid throughout its length by the integral channels thus provided at the top and bottom thereof.

The open side of the J trough is closed by gates 32 which likewise are provided with upper channel members 33 and lower channel members 35 and 36 which are arranged at complementary angles to the surfaces 26 and 27. As shown in FIG. 2, the gates comprise a vertical face 32 and an angular face 34, which connects the vertical face to the bottom channel 35, 36, and permits the trough to accommodate the auger flight 20. The face 32 is supported at suitable intervals by hinges 31, which extend over substantially the entire extent of face 32 and are secured to the face by suitable bolts or fasteners 29. These hinges 31 are clamped to shaft 30 by means of set screws 31b in order to secure the gate 32 to the shaft. The end of the shaft 30 are journaled in bearings 15 of hangers 14 for rotation therein. The shaft 30a shown in FIG. 1 is simply an extension of the shaft of an adjacent gate section which is similarly journaled in one of the bearings 15. Couplings 37 are provided to couple the shafts 30 to adjacent shafts 30a and 30b. The angular position of the gates 32 with respect to the shafts 30 may be adjusted by set screws 31b.

It will be noted that by reason of the configuration and mounting of the gates the center of gravity thereof will be such that the same will hang in open position as shown in FIG. 1. This is advantageous in that it reduces the force necessary to open the gates since their natural tendency will be to open. Additionally, about one-third of the gate is located above the pivot shaft 30 and two-thirds is located below it, which balances the gate and tends to hold it more rigidly. It will also be noted that the gates are provided with rigidifying channels 33, 35 and 36 at the top and bottom thereof, in addition to the supporting straps 31, so that the same may be held in alignment during operation and will resist deflection at such times as the pressure of feed within the trough tends to push against them. Channels 22, 23, 26 and 27 of the trough similarly rigidify the trough and the channel construction of both gate and trough overcome any tendency of the feeder to vibrate during operation or crack open the joining edges of the closure.

It will be further noted that by reason of the angularity of the bottom channel sides 35 and 36 which cooperate with the channel sides 26 and 27 of the trough, the aperture through which the feed spills when the gates are open is completely closed and sealed when the gates are closed and any residual particles of feed or cob trapped between the respective channels, if they can move at all, would have to move upwardly over the surfaces or lips 27 and 36 before they can fall down into the bunk. In other words, the lip 36 of the gate overlaps the lip 27 of the trough and when in nearly closed position these lips slope upwardly, and away from the bunk, and particles of feed would have to roll uphill in order to be discharged from the trough. Since this cannot occur, the particles have a tendency to pile up on one another and seal the opening in the trough even if the gate is not completely closed. Thus the trough is effectively and automatically sealed when the gates are closed and finely ground material is prevented from dribbling into the feed bunk.

It will be appreciated that the gates are opened and closed by rotating the shafts 30, 30a and 30b. This can be accomplished by appropriate means which are not per set a part of the present invention. Such means may comprise a timed mechanism which exerts an appropriate force against lever 38, thereby moving the lever in the direction of the arrows in FIG. 1 to rotate shafts 30, 30a, etc. and thereby effect opening or closing of the gates.

Having thus described our invention, we claim:

1. In a bunk feeder comprising a longitudinal substantially horizontal J-shaped trough having an open side, auger means supported and rotatable within said trough, the lower edge of said J-shaped trough being adjacent the vertical plane extending through the auger axis and being downturned at an angle short of a vertical plane and then backturned at an angle greater than a horizontal plane, a gate disposed along said open side of said trough for opening and closing same, a pivoted support for said gate disposed horizontally intermediate the upper and lower edges thereof, an edge at the lower end of said gate being downturned and backturned correspondingly with the lower edge of said trough, the backturned portions of said trough and gate edges constituting cooperating lips which are inclined upwardly when said gate is moved to nearly closed position whereby feed within the trough is prevented from running out of the trough when the lips are juxtaposed.

2. In a bunk feeder comprising a longitudinal substantially horizontal J-shaped trough having an open side, auger means supported and rotatable within said trough, the lower edge of said J-shaped trough being adjacent the vertical plane extending through the auger axis and being downturned at an angle short of a vertical plane and then backturned at an angle greater than a horizontal plane, a gate disposed along said open side of said trough for opening and closing same, a pivoted support for said gate disposed horizontally intermediate the upper and lower edges thereof at a distance about one-third from the top edge thereof, an edge at the lower end of said gate being downturned and backturned correspondingly with the lower edge of said trough, the backturned portions of said trough and gate edges constituting cooperating lips which are inclined upwardly when said gate is moved to nearly closed position whereby feed within the trough is prevented from running out of the trough when the lips are juxtaposed.

References Cited by the Examiner

UNITED STATES PATENTS

| | | | |
|---|---|---|---|
| 1,953,014 | 3/34 | Hankins | 105—424 |
| 3,105,586 | 10/63 | Carew et al. | 119—52 X |

SAMUEL KOREN, *Primary Examiner.*

HUGH R. CHAMBLEE, *Examiner.*